United States Patent [19]
Shinta et al.

[11] Patent Number: 5,315,704
[45] Date of Patent: May 24, 1994

[54] SPEECH/VOICEBAND DATA DISCRIMINATOR

[75] Inventors: Minoru Shinta; Shinichi Aikoh; Takao Nishitani, all of Tokyo, Japan

[73] Assignee: NEC Corporation, Tokyo, Japan

[21] Appl. No.: 618,844

[22] Filed: Nov. 28, 1990

[30] Foreign Application Priority Data

Nov. 28, 1989 [JP] Japan .................. 1-310134
Feb. 28, 1990 [JP] Japan .................. 2-47869

[51] Int. Cl.$^5$ .................................. G10L 9/00
[52] U.S. Cl. .......................... 95/2; 381/46; 395/22
[58] Field of Search ............ 381/42, 43, 46, 47; 364/513, 513.5, 724.19, 728.07, 602, 807; 307/201; 395/2, 21-27

[56] References Cited

U.S. PATENT DOCUMENTS

| | | | |
|---|---|---|---|
| 3,097,349 | 7/1963 | Putzrath et al. | 307/201 |
| 4,156,876 | 5/1979 | Debuisser | 364/728.07 |
| 4,281,218 | 7/1981 | Chuang et al. | 381/46 |
| 4,321,686 | 3/1982 | Horna | 364/724.19 |
| 4,457,013 | 6/1984 | Castellino et al. | 381/46 |
| 4,660,166 | 4/1987 | Hopfield | 364/807 |
| 4,715,065 | 12/1987 | Parker | 381/46 |
| 4,773,024 | 9/1988 | Faggin et al. | 364/513 |
| 4,807,168 | 2/1989 | Moopenn et al. | 364/602 |
| 5,048,100 | 9/1991 | Keperstein | 381/43 |

OTHER PUBLICATIONS

Lippmann, "An Introduction to Computing with Neural Nets", IEEE ASSP Magazine, Apr. 1987, pp. 4–22.
S. Casale et al., IEEE Globecom'88, Conference Record vol. III, pp. 1419–1427, "A DSP Implemented Speech/Voiceband Data Discriminator".

Primary Examiner—David D. Knepper
Attorney, Agent, or Firm—Sughrue, Mion, Zinn, Macpeak & Seas

[57] ABSTRACT

Input signals are processed to generate a plurality of signals having different features according to whether the input signals are speech signals or voiceband data signals, and these plural signals are entered into a neural network to be determined whether they have features closer to those of speech signals or of voiceband data signals. The classifying function of the neural network is achieved by inputting samples of speech signals and voiceband data signals and learning how to obtain correct classification results.

9 Claims, 5 Drawing Sheets

SPEECH/VOICEBAND DATA DISCRIMINATOR

BACKGROUND OF THE INVENTION

The present invention relates to a speech/voiceband data discriminator for determining whether a given digital input signal is a speech signal or a voiceband data signal.

With a view to effective utilization of long-distance lines for satellite communication and submarine cable communication, high efficiency digital circuit multiplication equipment (DCME) combining high efficiency speech coding (for instance ADPCM) and digital speech insertion techniques has been developed. This equipment requires different bit rates for the encoding of speech signals and that of voiceband data signals. For example, while speech signals are encoded at 32 kbps ADPCM, encoding of voiceband data signals, especially high speed voiceband data signals, at this bit rate would invite a data error rate higher than the permissible limit. In order to keep the data error ratio within the permissible limit, voice-band data signals should be encoded at a higher rate than speech signals are, for instance at 40 kbps ADPCM.

Therefore, the aforementioned high efficiency DCME requires a speech/voiceband data discriminator in order to distinguish between speech and voiceband data signals among time division multiplexed signals and lead them to their respective encoding circuits.

Such a speech/voiceband data discriminator is disclosed, for example, by S. Casale et al. in IEEE GLOBECOM'88 (Global Telecommunications Conference & Exhibition, 1988), Conference Record Vol. III, pp. 1419-1427. As illustrated in FIG. 2 of this article, the speech/voiceband data discriminator according to the prior art computes short time energy and zero crossing count for every one of three different signals—a given signal, a high frequency component resulting from the passing of this original signal by a high pass filter and a low frequency resulting from the passing of the original signal by a low pass filter—and the zero crossing counts of differential signals, and decides whether the given signal is a speech signal or a voiceband data signal by comparing the ranges of distribution of the computed results with the corresponding thresholds. Each of the thresholds, which this decision refers to, is set on the basis of the statistical analysis of sampled data collected in advance for speech and voiceband data signals. The final discrimination is made as to whether the input signal is a voice signal or a voiceband data signal with reference to the individual results of decision.

The conventional speech/voiceband data discriminator referred to above is so composed that the computed data of short time energy and zero crossing count are entered into separate decision circuits, whose decision results are further entered into a final decision circuit. Since the decision results of each decision circuit are denominated in one or the other of two levels, i.e. either "0" or "1", much of the information indicating correlations between short time energy and zero crossing count is lost. Accordingly, there can be obtained no sufficient quantity of information required for accurate discrimination between speech and voiceband data signals on various lines differing from each other in signal-to-noise ratio, resulting in a low discrimination ratio relative to the quantity of data processed.

Moreover, a vast volume of experimental data and a vast number of analyzing manhours are required to so set the threshold of each decision circuit as to permit the final decision to be made without inconsistency from the decision results of individual decision circuits.

BRIEF SUMMARY OF THE INVENTION

An object of the present invention is to provide a speech/voiceband data discriminator with a high discriminating probability.

Another object of the invention is to provide a speech/voiceband data discriminator capable of automatically setting parameters which give the conditions for signal discrimination.

A speech/voiceband data discriminator according to the invention processes an input signal to generate a plurality of signals having different characteristics according to whether the input signal is a speech signal or a voiceband data signal, and enters these processed signals into a neural network, whose regional classifying function is utilized to identify the input signal as a speech signal or a voiceband data signal.

Signals which indicate the auto-correlation such as the short time auto-correlation or the prediction coefficient of an adaptive correlator, are used as the signals having different characteristics depending on the type of input signal. As the neural network, a layered neural network is used because of its small circuit scale and easy learning process.

Since signals indicating the auto-correlation of input signals have distinctly different characteristics depending on whether the input signals are speech or voiceband data signals and, moreover, are hardly susceptible to the effects of white noise, they can be classified by a neutral network to give a high enough discrimination probability for practical purposes.

Furthermore, the weight of the neural network, which is a condition for signal discrimination, is automatically set during the learning process.

Moreover, where there are used plural sets of signals having characteristics differing with the type of input signal, for instance where the short time energy and zero crossing count of the input signals are used, those plural sets of signals can be entered into the same neural network to classify them including the relationships among the plural sets as well. Therefore, a higher discrimination ratio can be achieved than is provided by a conventional discriminator, which performs discrimination on a set-by-set basis.

BRIEF DESCRIPTION OF THE DRAWINGS

The above-mentioned and other objects, features and advantages of the present invention will be made more apparent by reference to the following detailed description when taken in conjunction with the accompanying drawings, in which:

FIGS. 2 (a) and (b) block diagrams illustrating the configuration of the neural network in FIG. 1;

FIGS. 7 (a) and (b) are block diagrams of a fifth preferred embodiment of the invention.

DETAILED DESCRIPTION OF THE PREFERRED EMBODIMENTS

Figure 1:
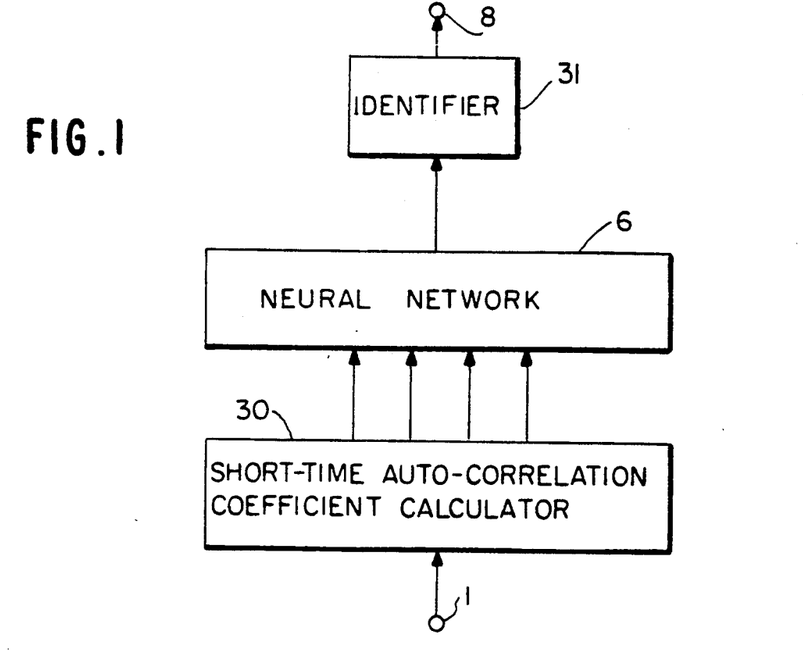
FIG. 1 is a block diagram of a first preferred embodiment of the invention.

Referring to FIG. 1, a first preferred embodiment of the present invention is composed by connecting in cascade a short time auto-correlation coefficient calculator 30, a neural network 6 and a decision circuit 31. In this circuit, a digital signal entered from an input terminal 1 is inputted to the short time auto-correlation coefficient calculator 30, which uses the time series of input digital signals {x(n): n is an integer} and a square window having a time window width W to calculate the auto-correlation coefficient by the following equation:

$$R_n(k) = \sum_{m=0}^{W-1} \times (n-m) \times (n-m-k) \quad (1)$$

$$(k = 0, 1, 2, \ldots, W-1)$$

This short time auto-correlation coefficient is normalized with $R_n(O)$, which is the power level of the input digital signal, to be cleared of the influence of the input digital signal amplitude, and becomes $<R_n(k)>$.

$$<R_n(k)> = \frac{R_n(k)}{R_n(0)} \quad (2)$$

The normalized short time auto-correlation coefficient is entered into the neural network 6.

Figure 2A:
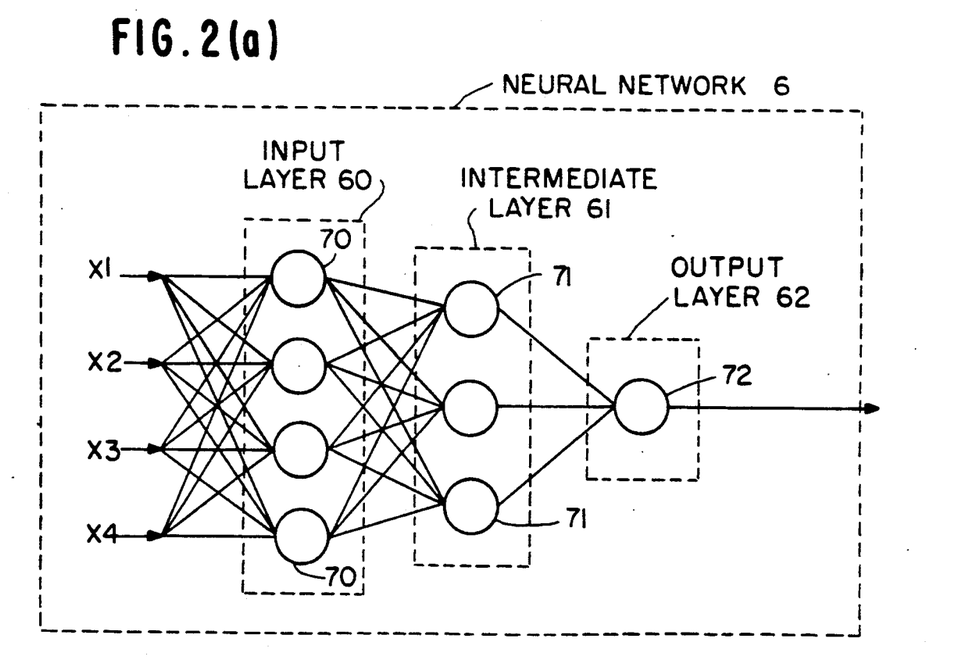
Figure 2B:
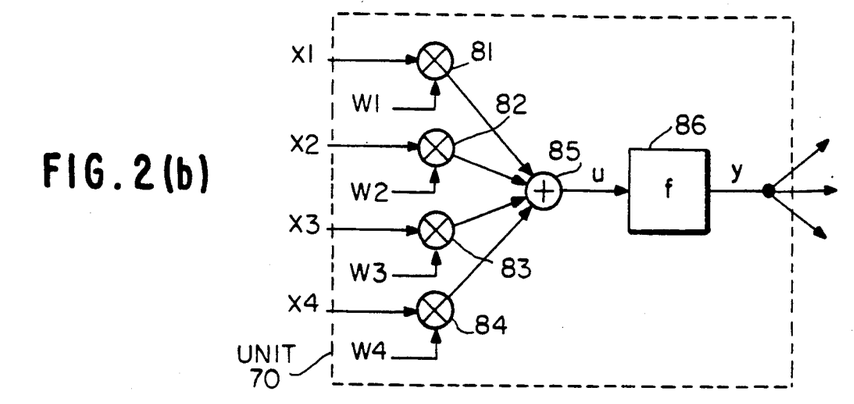

FIGS. 2 (a) and (b) are block diagrams typically illustrating the connecting configuration and constituent elements, respectively, of the neural network 6 in FIG. 1. Thus, FIG. 2 (a) shows the neural network having a layered structure comprising an input layer 60, an intermediate layer 61 and an output layer 62. The input layer 60 has four units 70; the intermediate layer 61, two units 71; and the output layer 62, one unit 72. The units 70, for instance, receive data $x_1$, $x_2$, $x_3$ and $x_4$ from the input ends as illustrated in FIG. 2 (b) and, after giving them weights $w_1$, $w_2$, $w_3$ and $w_4$ with multipliers 81, 82, 83 and 84, adds them into a total sum u:

$$u = \sum_{k=1}^{4} w_k \cdot x_k \quad (3)$$

This sum, after a function f is brought to act on it with a function generator 86, is supplied as output. As the function f, a differentiable sigmoid function, $$f(u) = 1/(1+e^{-u}) \quad (4)$$

is used, and this value is made the output data of the units 70.

The units 71 and 72 in FIG. 2 (a) similarly generate output data resulting from the total sums of their respective weighted input data on which a sigmoid function is brought to act. FIG. 2 (a) illustrates an example in which a layered neural network is used, having a configuration in which the input layer 60, the intermediate layer 61 and the output layer 62, none of which has a feedback connection from the output to the input side, are connected in cascade.

The layered neural network 6 learns the regional classifying function in a back propagation algorithm.

Thus input data are fed to each of the units 70 of the input layer 60, converted by each unit 70, and conveyed to the intermediate layer 61, and the resultant output is finally supplied from the output layer 62. This actual output value and the desirable output value are compared, and the weights $w_i$ are corrected step by step so as to minimize the difference between the two output values. In this correcting process, from the mth corrected value $w_i(m)$ of the weight $w_i$ on an input $x_i$ to a given unit, the (m+1)th corrected value $w_i(m+1)$ is computed by the following equations (5) to (7).

$$w_i(m+1) = w_i(m) + \eta \delta x'_i \quad (5)$$

where
  $x'_i$ is the input value to be multiplied by the weight $w_i$ in the unit, and
  $\eta$ is the learning coefficient
If the unit is within the output layer, $$\delta = v(1-v)(d-v) \quad (6)$$

where
  v is the actual output value, and
  d is the desirable output value.
If the unit is intermediate layer, $$\delta_j = x_j' (1 - x_j') \sum_k \delta_k w_k \quad (7)$$

where
  the total sum k covers all the units in the layers downstream from this particular unit, and
  $x'_j$ is the output value of this unit.

The foregoing algorithm gradually so corrects the weights $w_i$ as to minimize the average squared error between the actual output value v and the desirable output value d. In the learning procedure, after initial setting each weight in the neural network 6 temporarily, sampled data of short time auto-correlation functions (normalized) of many speech and voiceband data signals are successively entered into the neural network 6 to obtain output data. The desired output value has one of the two levels: "1" if a speech signal is entered or "0" if a voiceband data signal is entered. After the output data of the neural data 6 has been obtained for each sampled data unit, the correction of the weights by equations (5) to (7) is executed, beginning with the output layer 62 and proceeding toward the input layer 60. This correction is repeated until the minimal point of the aforementioned average squared error is reached.

After the completion of learning in the above described back propagation process, the neural network 6 operates using the learned weights. Short time auto-correlation coefficients entered during this operation are classified by the regional classifying function of the neural network 6 into short time auto-correlation coefficients in the speech signal region and ones in the voiceband data signal region.

The output of the neural network 6, even if it has learned, for instance, to output "1" for a speech signal and "0" for a voiceband data signal, can take consecutive values between "0" and "1" because the response function of the unit 72 is a sigmoid function. For this reason, when compared with a predetermined threshold (0.5 for example) by the decision circuit 31, an input signal is determined to be a speech signal if the output is not less than the threshold or a voiceband data signal if it is less than the threshold, and the result of discrimination is supplied from an output terminal 8.

Figure 3:
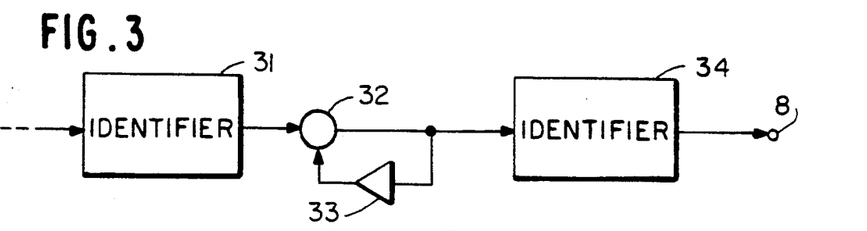
FIG. 3 is a block diagram illustrating part of a second preferred embodiment of the invention.

FIG. 3 is a block diagram of a second preferred embodiment of the present invention, which illustrates a configuration in which an integrator comprising an adder 32 and a multiplier 33, which multiplies the output data of the adder 32 by a constant to give an input data to the adder 32, is additionally connected after the decision circuit 31 of the first embodiment (see FIG. 1), and another decision circuit 34 is further additionally connected after the integrator.

The addition of this integrator makes it possible to smooth and remove sporadic discrimination errors, prevent the sporadic instability of discrimination results in a short period of time and thereby improve the discrimination probability.

Next will be cited an example of experimental data. This experiment was conducted with the circuit of FIG. 3 (involving that of FIG. 1) realized with a general purpose digital signal processor (DSP) integrated circuit ($\mu$PD77C25, a product of NEC Corp., Tokyo, Japan). The short time auto-correlation coefficient calculator 30 calculates the values of functions with the time window width W=64 and delays k=0 to 4, and enters normalized values R(1) to R(4) into the neural network 6. The neural network 6 used had a two-layered configuration having three units 70 in its input layer 60 and one unit 72 in its output layer 62, but had no intermediate layer 61. Learning by the neural network 6 was accomplished by off-line simulation on a minicomputer. The learning had as its objects speech signals from two male and one female Japanese adults and voiceband data signals of 2400 bps (CCITT V.26 bis), 4800 bps (V.27 bis) and 9600 bps (V.29), and the neural network 6 was caused to so learn by the back propagation method as to give an output of "1" when a speech signal was entered or one of "0" when a voiceband data signal was entered. The weight coefficients obtained by the learning were set into the neural network 6, for discrimination, and the discrimination probabilities listed in Table 1 were achieved.

TABLE 1

| Input Signal | | | No. | Discrimination Probability (A) (%) | Discrimination Probability (B) (%) |
|---|---|---|---|---|---|
| Speech | Japanese | F | ① | 97.50 | 90.93 |
| | Japanese | M | ② | 98.89 | 99.87 |
| | Japanese | M | ③ | 98.25 | 100.00 |
| | Japanese | F | ④ | 97.95 | 100.00 |
| | Japanese | M | ⑤ | 98.87 | 99.90 |
| | English | F | ⑥ | 98.64 | 100.00 |
| | English | M | ⑦ | 98.99 | 100.00 |
| Voice-band Data | V.23 | 1200 bit/s | ⑧ | 100.00 | 100.00 |
| | V.26bis | 2400 bit/s | ⑨ | 100.00 | 100.00 |
| | V.27bis | 4800 bit/s | ⑩ | 99.98 | 100.00 |
| | V.29 | 9800 bit/s | ⑪ | 99.73 | 100.00 |
| | V.32 | 9600 bit/s | ⑫ | 99.94 | 100.00 |

(Approximately 2 seconds each)

In Table 1, the discrimination Probability (A) refers to the experimental data with the embodiment of FIG. 1, and the discrimination probability (B), those with the embodiment of FIG. 3. Speech signals ① to ③ and voiceband data signals ⑨ to ⑪ are learned input signals, and the remaining speech signals ④ to ⑦ and voiceband data signals ⑧ and ⑨, unlearned input signals.

As hitherto described, the first and second preferred embodiments are capable of classifying the features of input digital signals by a few short time auto-correlation coefficients concerning delays, and achieve sufficiently high discrimination probability for practical purposes. Along with that, the required number of units in the neural network can be reduced, and the network can automatically accomplish learning in a shorter period of time.

As regards the neural network 6, although a layered one is caused to learn by the back propagation method in the above described embodiments, this is not the only choice. An interlinked type, involving feedback links for the connection of units, can as well be caused to learn by a method proposed by J. J. Hopfield or another by G. E. Hinton et al. These learning methods are described in the following pieces of literature.

Hopfield, J. J.: Neural network and physical systems with emergent collective computational abilities, Proc. Natl. Acad. Sci. U.S.A., vol. 79, 1982.

Hopfield, J. K.: Neurons with graded response have collective computational properties like those of two-state neurons, Proc. Natl. Acad. Sci. U.S.A., vol. 81, 1984.

Ackley, D. H. Hinton, G. E. and Sejnowski, T. J.: A Learning Algorithm for Boltzmann Machines, Cognitive Sci., 9, 1985.

Figure 4:
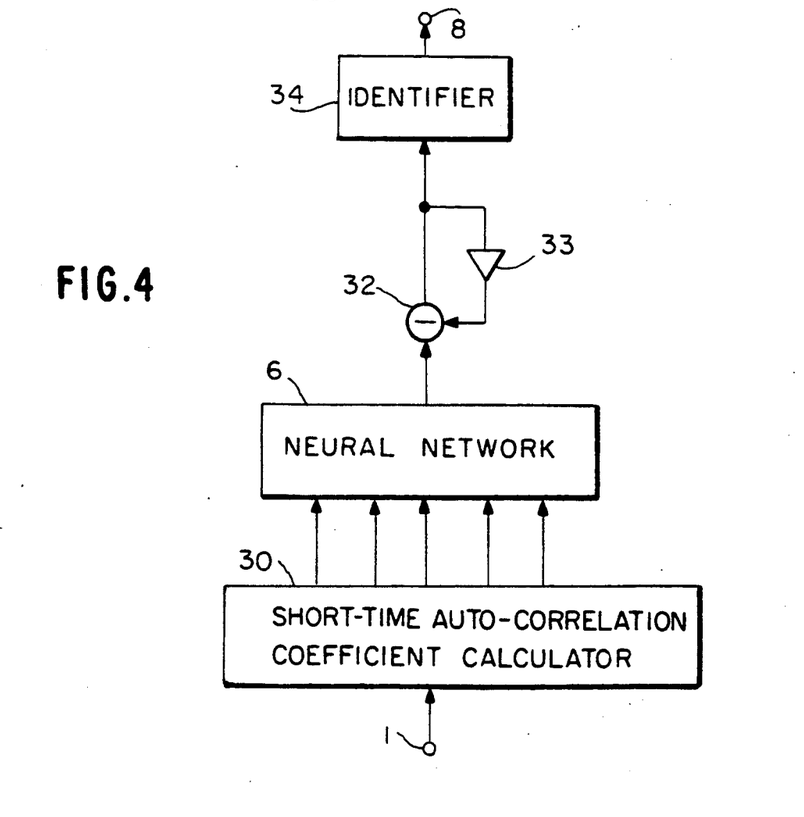
FIG. 4 is a block diagram of a third preferred embodiment of the invention.

FIG. 4 is a block diagram of a third preferred embodiment of the present invention, which illustrates a configuration in which an integrator comprising an adder 32 and a multiplier 33 is connected immediately after the neural network 6 of the first embodiment shown in FIG. 1, and a decision circuit 34 is additionally connected, which determines whether a given input signal is a speech signal or a voiceband data signal according to whether the output data value of the integrator exceeds a threshold or not. This configuration, equivalent to the embodiment of FIG. 3 deprived of the decision circuit 31, can achieve steady discrimination results by smoothening the sporadic instability of the function values outputted by the neuron network 6 as in the case illustrated in FIG. 2 (a) and (b).

In the circuits of FIGS. 1, 3 and 4, when the background white noise contained in input digital signals is too great to ignore, the short time auto-correlation coefficient R(O) for a delay of k=0 increases by the power level of the background white noise. On the other hand, short time auto-correlation coefficients R(n) (n>0) for other delays than k=0 are hardly affected by the background white noise. As a result, the short time auto-correlation coefficients <R(n)>(n>0) normalized with reference to R(O) take smaller values than when no noise is involved, and thereby become more likely to commit signal discrimination errors.

Figure 5:
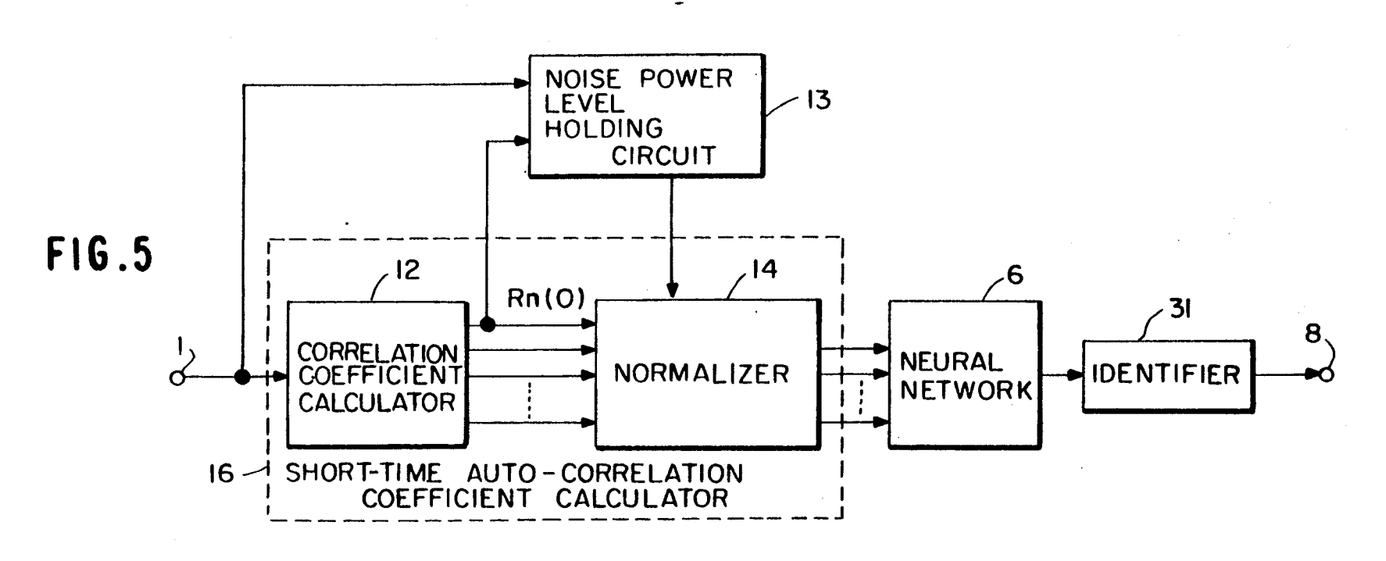
FIG. 5 is a block diagram of a fourth preferred embodiment of the invention.

FIG. 5 is a block diagram of a fourth preferred embodiment of the present invention, which is supplemented with means to eliminate such an adverse effect of background white noise. The circuit shown in this diagram has a configuration in which the circuit of FIG. 1 is augmented with a noise power level holding circuit 13, which receives an input digital signal and $R_n(O)$ provided by a short time auto-correlation coefficient calculator 16, and holds the power level of input digital signals in their silent part.

Figure 6:
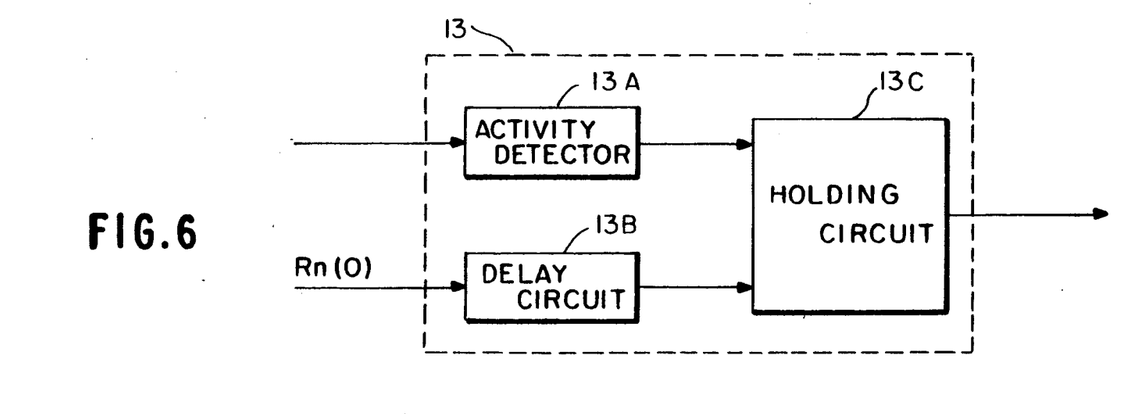
FIG. 6 is a block diagram illustrating the configuration of the noise power level holding circuit in FIG. 5.

The noise power level holding circuit 13, as shown in FIG. 6, consists of an activity detector 13A for detecting the sound part of input digital signals, a delay circuit 13B for delaying the entered power level of the input signal by a sampling time corresponding to the detection time of the activity detector 13A, and a holding circuit 13C for holding the signal power level when the activity detector 13A has given an output indicating silence.

Now will be described the operation of this preferred embodiment with reference to FIGS. 5 and 6.

A digital signal entered from the input terminal 1 is inputted to the correlation coefficient calculator 12 and the noise power level holding circuit 13 of the short time auto-correlation coefficient calculator 16. The correlation coefficient calculator 12, as in the case of the circuit shown in FIG. 1, calculates a short time auto-correlation coefficient by equation (1) cited above.

In the noise power level holding circuit 13, the input digital signal is entered into the activity detector 13A, which determines whether the entered digital signal has sound or is silent. The delay circuit 13B compensates for any delay in detection by the activity detector 13A by delaying the input signal, i.e. the power level $R_n(O)$, by a sampling time corresponding to the delay time before outputting the signal. The holding circuit 13C holds the output value of the delay circuit 13B at the time of a change in the output of the activity detector 13A from silence to a sounding state.

Thus the noise power level holding circuit 13 receives as its inputs the input digital signal and the short time auto-correlation coefficient $R_n(O)$ (input signal power level) having zero delay, supplied by the correlation coefficient calculator 12, holds and outputs the power level of background white noise in the absence of input digital signal.

Into a normalizer 14 are entered the output data of the correlation coefficient calculator 12 and the noise power level holding circuit 13. The input signal power level $R_n(O)$ here includes the power level of background white noise added to it, and this power level of background white noise is deemed constant irrespective of the presence or absence of signal. Therefore, the power level of background white level is that of the input signal in the absence of input digital signal, and it is outputted from the noise power level holding circuit 13. In the normalizer 14, the output level of the noise power level holding circuit 13 is subtracted from the input signal power level $R_n(O)$, which is also cleared of the effect of background white noise, resulting in a short time auto-correlation coefficient $R'_n(O)$ having zero delay.

$$i\ R'_n(O) = R_n(O) - NOISE \qquad (8)$$

where NOISE is the output level of the noise power level holding circuit 13.

Normalization by the normalizer 14 is accomplished by the following equation (9) using the result of equation (8).

$$R'_n(k) = \frac{R_n(k)}{R'_n(0)} \qquad (9)$$

The short time auto-correlation coefficient obtained by equation (9) is immune from the effect of background white noise because it is normalized with reference to the short time auto-correlation coefficient $R'_n(O)$ cleared of the effect of background white noise. This normalized short time auto-correlation coefficient is entered into the neural network 6, and the entered short time auto-correlation coefficient is ascribed by the regional classifying function of the neural network 6 to either the speech signal region or the voiceband data region.

The output of the neural network 6, even if it has learned, for instance, to output "1" for a speech signal and "0" for a voiceband data signal, can take consecutive values between "0" and "1" because the response functions of the neuron units are sigmoid functions. For this reason, when compared with a predetermined threshold (0.5 for example) by the decision circuit 31, an input signal is determined to be a speech signal if the output is not less than the threshold or a voiceband data signal if it is less than the threshold, and the result of discrimination is supplied from the output terminal 8.

Thus this preferred embodiment provides short time auto-correlation coefficients $R'_n(k)$, unaffected by background white noise, by normalizing the short time auto-correlation coefficients $R_n(O)$ with reference to a value from which the signal power level of background white noise has been subtracted. As a result, the probability of discrimination between speech and voiceband data signals does not deteriorate even in an environment where much background white noise is present.

Figure 7A:
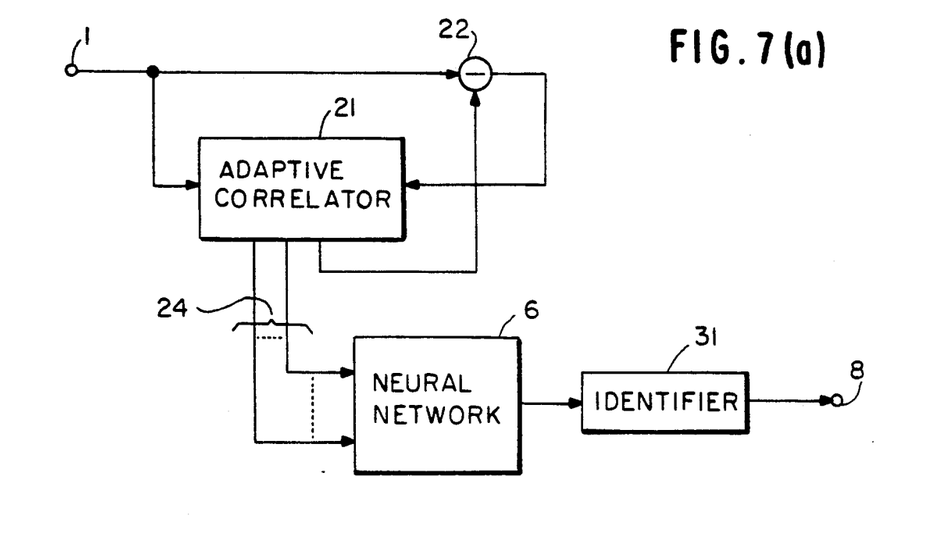
Figure 7B:
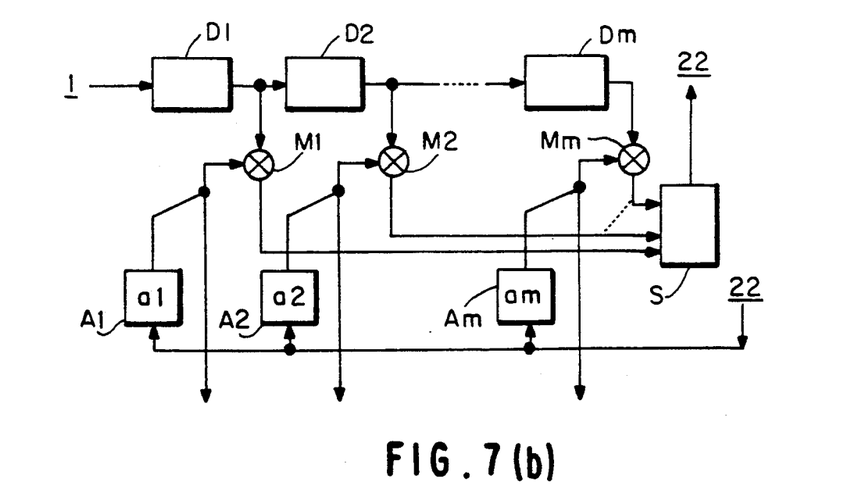

FIGS. 7 (a) and (b) are block diagrams illustrating a fifth preferred embodiment of the present invention. Referring to FIG. 7(a), a digital signal entered from the input terminal 1 is inputted to an adaptive correlator 21 and a subtractor 22. The adaptive correlator 21 which may be, for instance, one for use in ADPCM receives from the subtractor 22 an error signal which is the difference between a predictive signal and the input digital signal, and so corrects a prediction coefficient 24 as to bring the error signal close to zero. The adaptive correlator 21, as shown in FIG. 7(b), multiplies the tap outputs of a tapped delay circuit consisting of m (m is an integer) delayers $D_1, D_2, \ldots, D_m$ by coefficients $a_1, a_2, \ldots, a_m$ provided by coefficient generators $A_1, A_2, \ldots, A_m$ with multipliers $M_1, M_2, \ldots, M_m$, adds the respective results of multiplication with an adder S, and supplies the resultant sum as a predictive signal. Each of the coefficients $a_1$ to $a_m$, adaptively corrected so as to bring the error signal received from the subtractor 22 close to zero, is supplied to the multipliers $M_1$ to $M_m$ and at the same time to the neural network 6 as the prediction coefficient 24.

This prediction coefficient differs in feature depending on whether the input digital signal is a speech signal or a voiceband data signal, and moreover is dependent on neither the signal-to-noise ratio nor signal amplitude of the input digital signal. It is classified as either a speech signal or a voiceband data signal by the neural network 6 having completed learning, and further identified by the decision circuit 31, which compares it with a threshold.

Figure 8:
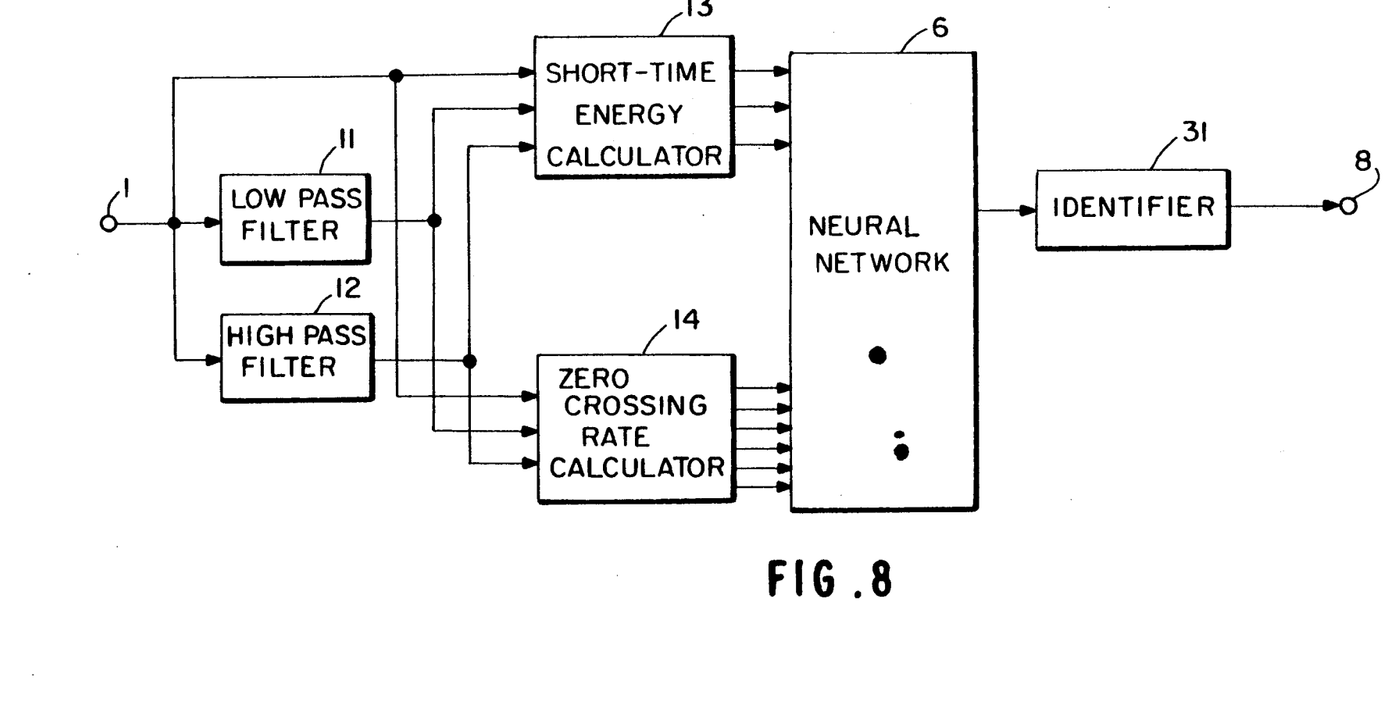
FIG. 8 is a block diagram of a sixth preferred embodiment of the invention.

FIG. 8 is a block diagram of a sixth preferred embodiment of the present invention. Referring to the diagram, an input digital signal entered from the input terminal 1 is inputted to a low pass filter 11, a high pass filter 12, a short time energy calculator 13 and a zero crossing rate claculator 14. The short time energy calculator 13 receives the input signal and the output signals of the low pass filter 11 and the high pass filter 12, and calculates the short time energy of each signal. The zero crossing rate calculator 14 receives the input signal and the output signals of the low pass filter 11 and the high pass filter 12, and calculates the zero crossing rate of each and that of the signal of difference between each received signal and a signal one sample before. Into the neural network 6 are entered in parallel the output signals of a short time energy calculator 13 and a zero crossing rate calculator 14.

These input signals to the neural network 6, like those used in any conventional speech/voiceband data discriminator, have different features depending on whether they pertain to speech signals or voiceband data signals. While short time energies and zero crossing rates are supplied to separate decision circuits for signal discrimination in the conventional discriminator, both are fed in parallel to the neural network 6 in this preferred embodiment of the invention to be classified into different signal regions. Therefore, unlike in the conventional discriminator where signals cannot be distinguished according to correlations between short time energies and zero crossing rates, this embodiment is capable of integrated signal discrimination taking account of their correlations as well, resulting in a higher discrimination probability than the conventional circuit.

Although the present invention has been described with reference to specific embodiments, this description is not meant to be construed in a limiting sense. Various modifications of the disclosed embodiments, as well as other embodiments of the invention, will become apparent to persons skilled in the art upon reference to the description of the invention. It is therefore contemplated that the appended claims will cover any such modifications or embodiments as fall within the true scope of the invention.

What is claimed is:

1. A speech/voiceband data discriminator comprising:
    signal processing means for processing input signals to generate a plurality of signals having different characteristics according to whether the input signals are speech signals or voiceband data signals,
    a neural network responsive to said plurality of signals for generating functional value data to indicate whether the input signals have features close to speech signals or to voiceband data signals, and
    decision means responsive to said functional value data for deciding based on said functional value data whether said input signals are speech signals or voiceband data signals and for supplying signals to indicate the decision, wherein said signal processing means calculates the short time auto-correlation coefficients of said input signals, and generate and send to said neural network a plurality of signals indicating such coefficients,
    wherein said decision means further comprising means for smoothening the data of said functional value with an integrator, and means for comparing the magnitudes of the smoothened data and a predetermined threshold and for outputting a signal indicating whether said input signals are speech signals or voiceband data signals.

2. A speech/voiceband data discriminator, as claimed in claim 1, wherein said signal processing means generates a plurality of signals indicating normalized coefficient values obtained by dividing by a coefficient value corresponding to a delay of zero all other coefficient values, and sends said plurality of signals to said neural network.

3. A speech/voiceband data discriminator, as claimed in claim 1, wherein said signal processing means has a correlation coefficient calculator for calculating the short time auto-correlation coefficients of said input signals,
    a noise power level holding circuit for detecting the silent part of said input signals and holding the value of said short time auto-correlation coefficient corresponding to a delay of zero at the time of detecting the silent part, and
    a normalizer for sending out a plurality of signals indicating normalized coefficient values obtained by dividing said short time auto-correlation coefficients not corresponding to a delay of zero by a value obtained by subtracting the value held by said noise power level holding circuit from said short time auto-correlation coefficient corresponding to a delay of zero.

4. A speech/voiceband data discriminator, as claimed in claim 3, wherein said noise power level holding circuit has:
    a activity detector for detecting the silent part of said input signals,
    a delaying circuit for means for delaying said short time auto-correlation coefficient corresponding to a delay of zero by a sampling time corresponding to the detection time of said activity detector, and
    a holding circuit for holding and outputting the output signal of said delay circuit when the detection result of said activity detector indicates the silent part.

5. A speech/voiceband data discriminator, as claimed in claim 1, wherein said signal processing means has an adaptive correlator for so adaptively correcting prediction coefficients and generating predictive signals as to bring the error between each of said input signals and the corresponding one of said predictive signals close to zero, and
    sends to said neural network a plurality of signals indicating the values of said predictive signals.

6. A speech/voiceband data discriminator, as claimed in claim 1, wherein said signal processing means calculates the short time energies of said input signals and the zero crossing rates of said input signals and the differential signals thereof, and sends to said neural network a plurality of signals each indicating one or another of the calculated values.

7. A speech/voiceband data discriminator, as claimed in claim 1, wherein said neural network is a layered one including at least one unit for bringing a predetermined function on the total sum of the weights of a plurality of input signals and outputting the data of said functional value, and having a configuration in which at least one layer having no inter-unit feedback connections is connected in cascade, and
    learns and sets said weights by a back propagation method.

8. A speech/voiceband data discriminator, as claimed in claim 1, wherein said neural network is an interlinked type which includes a plurality of units for bringing a predetermined function on the total sum of the weights of a plurality of input signals and outputting the data of said functional value, and in which said units have feedback connections among them, and
    learns and sets said weights.

9. A speech/voiceband data discriminator comprising:
- signal processing means for processing input signals to generate a plurality of signals having different characteristics according to whether the input signals are speech signals or voiceband data signals,
- a neural network responsive to said plurality of signals for generating functional value data to indicate whether the input signals have features close to speech signals or to voiceband data signals, and
- decision means responsive to said functional value data for deciding based on said functional value data whether said input signals are speech signals or voiceband data signals and for supplying signals to indicate the decision, wherein said signal processing means calculates the short time auto-correlation coefficients of said input signals, and generate and send to said neural network a plurality of signals indicating such coefficients;
- wherein said decision means further comprising first means for comparing the magnitudes of the data of said functional value and a first predetermined threshold and, integrating means for smoothening the result of said first means for comparing with an integrator, second means for comparing the magnitudes of the smoothened result and a second predetermined threshold and for outputting a signal indicating whether said input signals are speech signals or voiceband data signals.

* * * * *